United States Patent [19]
Frank et al.

[11] Patent Number: 5,649,990
[45] Date of Patent: Jul. 22, 1997

[54] COMBINATION FLEXIBLE/RIGID RING MOLD

[75] Inventors: Robert G. Frank, Sarver; Samuel E. Behanna, New Kensington; Rudolph A. Karlo, Creighton; Jeffrey L. Marietti, Tarentum, all of Pa.

[73] Assignee: PPG Industries, Inc., Pittsburgh, Pa.

[21] Appl. No.: 527,912

[22] Filed: Sep. 14, 1995

[51] Int. Cl.$^6$ .................................................. C03B 23/03
[52] U.S. Cl. ......................... 65/106; 65/273; 65/287; 65/291
[58] Field of Search ............................ 65/106, 102, 287, 65/289, 290, 291, 268, 273

[56] References Cited

U.S. PATENT DOCUMENTS

| | | | |
|---|---|---|---|
| 4,108,624 | 8/1978 | Claassen | 65/106 |
| 4,496,386 | 1/1985 | Hymore et al. | 65/106 |
| 4,501,603 | 2/1985 | Frank et al. | 65/106 |
| 4,579,577 | 4/1986 | Claassen | 65/273 |
| 4,830,650 | 5/1989 | Kelly | 65/106 |
| 5,286,271 | 2/1994 | Rueter et al. | 65/106 |
| 5,401,286 | 3/1995 | Goolsbay et al. | 65/106 |

*Primary Examiner*—Steven P. Griffin
*Attorney, Agent, or Firm*—Andrew C. Siminerio

[57] ABSTRACT

A flexible shaping ring for shaping heat softened glass sheets lifts a heat softened glass sheet and presses it against the shaping surface of an upper mold. As the shaping ring presses the marginal edge portion of the sheet against the upper mold, its shaping surface deforms to generally conform to a corresponding portion of the upper mold. A press ring subsequently contacts the shaping ring and presses it against the upper mold to further shape the marginal edge portion of the glass sheet and ensure the marginal edge completely conforms to the shape of the upper mold.

19 Claims, 3 Drawing Sheets

COMBINATION FLEXIBLE/RIGID RING MOLD

BACKGROUND OF THE INVENTION

This invention relates to shaping heat softened sheet material, and in particular to shaping heat softened glass sheets between an upper mold and a lower combination flexible/rigid ring mold.

Shaped and tempered glass sheets are widely used as windows in vehicles such as automobiles and the like. To fabricate these windows, flat glass sheets must be shaped to precisely defined curvatures dictated by the shape and outline of the window frame openings in the vehicle. It is important that the windows meet stringent optical requirements and be free of optical defects that would tend to interfere with clear viewing through the window.

Commercial production of shaped glass sheets commonly includes the steps of serially conveying the glass sheets through a tunnel type furnace where they are heated to their heat deformation temperature and thereafter conveying the heat softened sheets into a shaping station where they are shaped by pressing each sheet between a pair of vertically, aligned upper and lower shaping molds. After shaping, the molds separate with the shaped glass sheet remaining secured to the upper mold by vacuum. A transfer ring having an outline and shape conforming to the desired curvature of the glass sheet slightly inboard of its perimeter, moves beneath the upper mold which thereafter releases the vacuum and deposits the shaped glass sheet on the ring. The ring then transfers the shaped glass sheet into a cooling station for controlled cooling.

The lower mold in such sheet shaping arrangement may include a rigid shaping ring as disclosed in U.S. Pat. No. 4,496,386 to Hymore et al. or a flexible shaping ring as disclosed in U.S. Pat. No. 4,830,650 to Kelly. During shaping, the lower mold moves upward from a position below the conveying surface of the convey rolls to lift the glass sheet off the conveying rolls and into engagement with the upper mold. Each of these shaping arrangements have certain shortcomings. When using a rigid ring, since the ring has an elevational configuration generally corresponding to the final desired peripheral shape of the glass sheet, the ring does not simultaneously contact the entire marginal edge of the glass sheet as it initially lifts the sheet off the conveyor rolls. Rather, the rigid ring progressively engages the marginal edge with the higher points of the ring contacting the ring first. As a result, the glass may slide along the sheet engaging surface of the ring as the glass is shaped. When using a flexible ring mold, the ring has a flat undeformed configuration when it initially engages the glass sheet so that the entire marginal edge of the sheet is contacted simultaneously by the ring as the ring lifts the sheet off the conveyor rolls. However, as the glass is pressed against the upper mold, the pressure applied by the flexible ring depends on the member used to maintain the ring in an undeformed configuration. For example, in a ring as disclosed in U.S. Pat. No. 4,830,650, the pressing force depends on the spring constants of the springs which support the flexible ring.

It would be advantageous to provide an arrangement whereby the lower mold simultaneously engages the entire marginal edge portion of a glass sheet to be shaped, preliminarily shapes the glass sheet and further positively presses the marginal edge against an upper shaping mold to ensure that the configuration of the marginal edge portion of the sheet fully conforms to the shape of the upper mold.

SUMMARY OF THE INVENTION

The present invention provides an apparatus for shaping heat softened sheet material having upper and lower molds and an auxiliary press member. The upper mold is a full surface mold having a sheet shaping surface which generally corresponds to a final desired contour of a sheet to be shaped. The lower mold includes a shaping ring vertically aligned below the upper mold and has a flexible sheet engaging surface generally corresponding a marginal edge portion of the sheet to be shaped. The auxiliary press member is a rigid press ring positioned vertically aligned below and movable relative to the shaping ring and has an upper surface with a fixed outline shape and elevational contour corresponding to the final desired contour of the marginal edge portion of the sheet. Means are provided to transfer the sheet onto the shaping ring such that the flexible surface of the shaping ring supports the sheet about its marginal edge portion while the ring is in a generally flat configuration and further to move the upper and lower molds relative to each other to contact the sheet with the sheet shaping surface of the upper mold. The shaping ring presses the marginal edge portion of the sheet against the upper mold sheet shaping surface and deforms to generally conform to a corresponding portion of the sheet shaping surface of the upper mold. Means are provided to engage the shaping ring with the auxiliary press member to press the shaping ring against the upper mold and completely conform the flexible surface and the marginal edge portion of the sheet to the corresponding portion of the sheet shaping surface of the upper mold.

The present invention also provides a mold assembly for shaping heat softened sheet material. The assembly includes a shaping ring having a flexible sheet engaging surface generally corresponding to a marginal edge portion of a sheet to be shaped and an auxiliary press member movable relative to the shaping ring between a first position wherein the press member is spaced from the shaping ring, and a second position wherein the press member contacts the shaping ring. The shaping ring is supported by shaping ring supports which allow the flexible surface to deform from a flat to curved configuration. The press member is preferably a rigid press ring having an upper surface with a fixed outline shape and elevational contour corresponding to a final desired contour of a marginal edge portion of a sheet to be shaped.

The present invention further provides a method of shaping heat softened sheet material including the steps of engaging marginal edge portions of a sheet to be shaped with a shaping ring having a flexible sheet engaging surface, moving the shaping ring and sheet toward an upper shaping mold having a contoured shaping surface generally corresponding to a final desired shape of the sheet, pressing the sheet against the upper mold sheet shaping surface while deforming the flexible surface of the shaping ring to generally conform the marginal edge portions of the sheet to corresponding portions of the upper mold, contacting the shaping ring with an auxiliary press member, and pressing the auxiliary member against the shaping ring to further shape the marginal edge portion of the sheet between the shaping ring and the upper mold. The shaping ring preferably has a flat configuration when it initially engages the sheet so that it simultaneously contacts and supports the entire marginal edge of the sheet.

DETAILED DESCRIPTION OF THE INVENTION

The present invention is taught in conjunction with its use in shaping heat softened glass sheets, but it is understood that the invention may be used in shaping any type of heat softened sheet material shaping arrangement.

Figure 1:
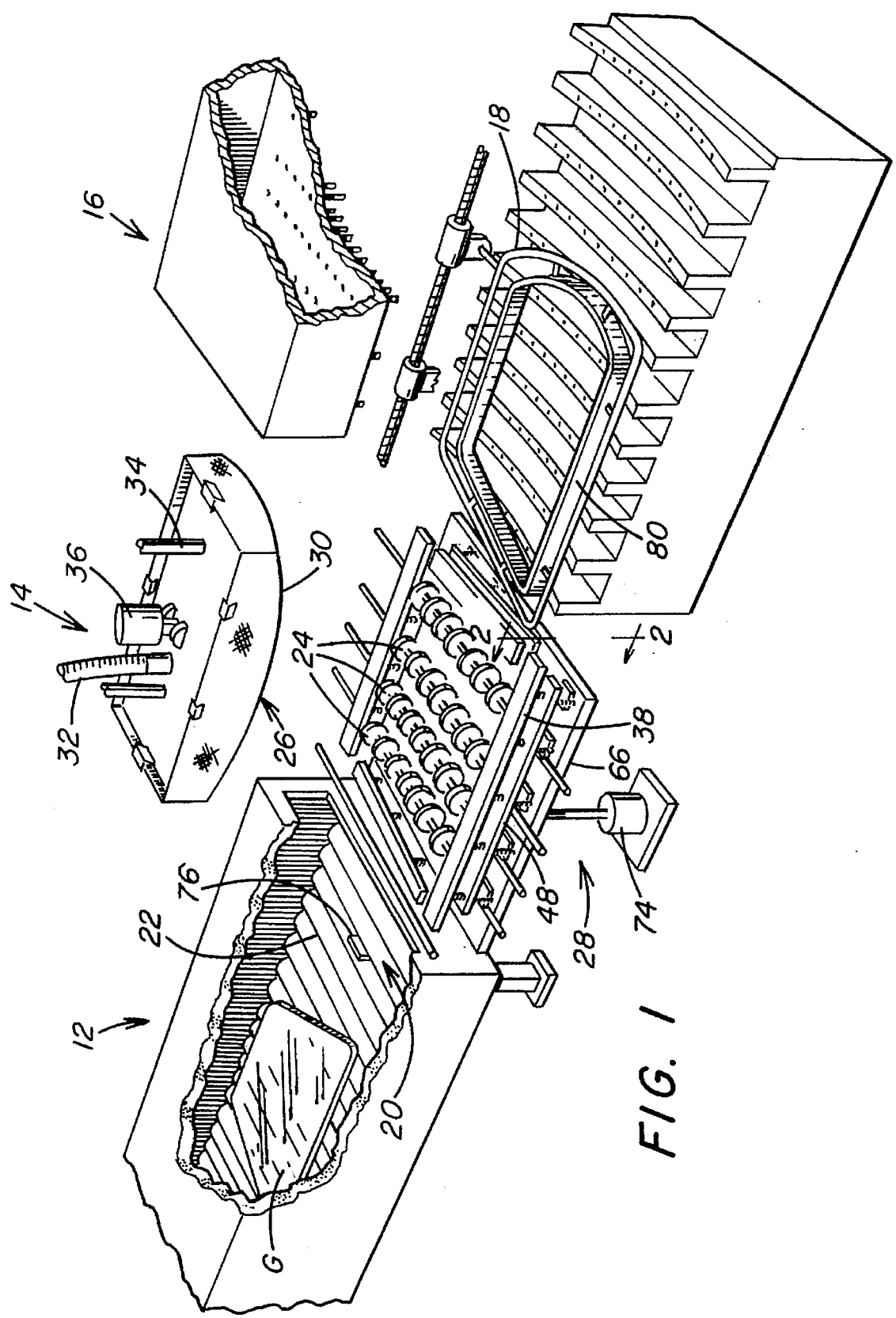
FIG. 1 is a partly fragmentary perspective view looking upstream at a glass sheet bending arrangement incorporating the teachings of the present invention.

Referring to FIG. 1, an apparatus for heating and shaping sheets of heat softened materials such as glass, includes a furnace 12 through which glass sheets G are serially conveyed from a loading station (not shown) to heat each sheet to its deformation temperature, a shaping station 14 to shape the glass sheets, a cooling station 16 for cooling the shaped sheets, and an unloading zone (not shown) beyond the cooling station 16. Although not limiting in the present invention, the loading and unloading zones, furnace 12, shaping station 14 and cooling station 16 are aligned in end-to-end relation. A sheet transfer means 18 located at the cooling station 16 transfers the shaped glass sheet G between the shaping station 14 and cooling station 16.

The furnace 12 includes a horizontal conveyor 20 with longitudinally spaced, transversely extending conveyor rolls 22 that define a path of travel which extends through the furnace 12. The rolls 22 in the conveyor 20 are arranged in sections and their rotational speed is controlled through clutches (not shown) so that the speed of each conveyor section may be controlled and synchronized in any convenient manner.

The shaping station 14 includes a series of spaced apart, donut shaped support rolls 24, an upper shaping mold 26 and a lower shaping mold 28, which is the subject of the present invention. Rolls 24 support the heat softened glass sheet G as it exits the furnace 12 and enters the shaping station 14. If desired, rolls 24 may be replaced with rolls (not shown) that provide continuous transverse support of the sheet G within lower shaping mold 28.

Although not limiting in the present invention, the upper mold 26 is a vacuum mold, e.g. as disclosed in U.S. Pat. No. 4,579,577. The shaping surface 30 of the mold 26 conforms to the final desired shape of the glass sheet G. If desired, surface 30 may be covered with a heat resistant fabric (not shown), e.g. fiber glass or stainless steel cloth. With continued reference to FIG. 1, the upper vacuum mold 26, which communicates with a vacuum source (not shown) through an evacuation pipe 32 and suitable valve means (not shown), is connected through upper vertical guide rods 34 to a support frame (not shown) and is vertically moveable relative to the frame via a piston arrangement 36. The evacuation pipe 32 may be connected through a suitable valve arrangement to a source of pressurized air (not shown) which may be used to help separate the shaped sheet G from the mold 26.

Figure 2:
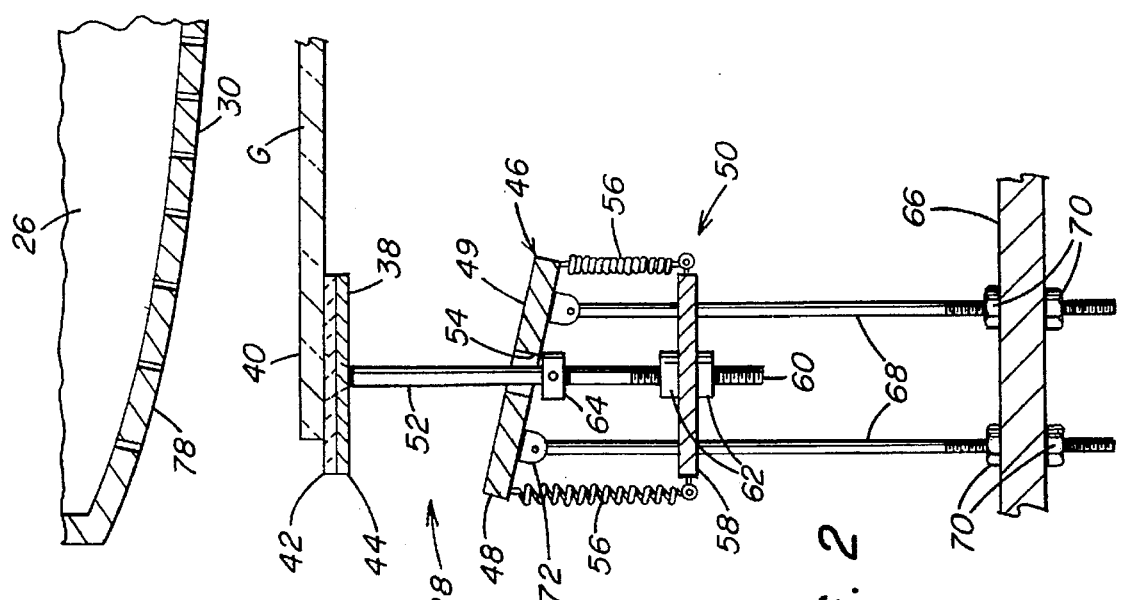
FIG. 2 is a view taken along line 2—2 of FIG. 1 illustrating the flexible shaping ring and rigid ring of the present invention as the lower mold supports the marginal edge of a heat softened glass sheet, with portions removed for clarity.

Referring to FIG. 2, the lower mold 28 includes an upper flexible shaping ring 38. The flexible ring 38 is generally flat and in an undeformed configuration when it initially engages the marginal edge portion 40 of a heat softened glass sheet G and subsequently conforms to the corresponding curvature of the upper mold 26 during shaping, as will be discussed later in more detail. Heat resistant board 42 is secured to flexible support 44 of flexible ring 38 in a manner such that if required, as the board 42 and support 44 flex during shaping, they may slide relative to each other. The combination of board 42 and support 44 which form ring 38 should be sufficiently rigid to support the heat softened glass sheet G as it is engaged by the lower mold 28, but also sufficiently flexible to deform and conform to the configuration of a corresponding portion of the upper mold 26, as will be discussed later. In one particular embodiment of the invention, board 42 is 0.125 inch (3.18 mm) thick Spauldite® ARK-2 aramid laminate available from Spaulding Fibre Co., Inc., New York and support 44 is 0.030 inch (0.76 mm) thick spring steel. If desired, additional heat resistant materials, such as fiberglass or metal press cloth (not shown), may be used to cover the ring 38.

Shaping station 14 further includes an auxiliary pressing member 46 is which contacts the flexible ring 38 after ring 38 has deformed and initially pressed the marginal edge portion 40 of sheet G against shaping surface 30 of upper mold 26, to ensure that the configuration of the marginal edge portion 40 of the sheet G fully conforms to the shape of the corresponding portion of mold 26, as will be discussed later. In the particular embodiment of the invention illustrated in FIGS. 1–3, this auxiliary pressing member 46 is a rigid press ring 48 vertically aligned below and spaced from the flexible ring 38. The rigid ring 48 has a shaping surface 49 with a fixed outline shape and elevational contour that generally corresponds to the final desired shape of the marginal edge portion 40 of the glass sheet G to be shaped. In one particular embodiment of the invention, ring 48 is 3/16 inch (0.476 cm) thick bar steel.

With continued reference to FIG. 2, the flexible ring 38 includes a plurality of support assemblies 50 (only one shown in FIG. 2). Support assemblies 50 allows the flexible ring 38 to initially engage the entire marginal edge portion 40 of the heat softened glass sheet G while the ring 38 is in a flat, undeformed configuration and subsequently conform to the shaping surface 30 of the upper mold 26 as ring 38 and glass marginal edge portion 40 are pressed between mold 26 and ring 48, as will be discussed later in more detail. In one embodiment of the invention, each support 50 includes a support post 52 which is secured in any convenient manner to support 44 of ring 38 and extends slidably through an opening 54 in rigid ring 48. Although not required, post 52 may extend perpendicularly from support 44 and initially angularly offset relative to ring 48. Opening 54 should be large enough to allow post 52 to freely slide therethrough while being angularly offset relative to rigid ring 48, as will be discussed later in more detail. Positioning member 56 interconnects post 52 to the rigid press ring 48 and provides a force that tends to bias flexible ring 38 away from rigid ring 48. In the particular embodiment illustrated in FIGS. 2 and 3, positioning member 56 interconnects post 52 to the rigid press ring 48 through a bar 58 which is secured to the lower end 60 of post 52 below ring 48 in any convenient manner. Bar 58 may be adjustably secured to post 52 by threaded nuts 62. The force applied to shaping ring 38 by positioning member 56 also provides the initial shaping force applied by ring 38 to the marginal edge portion 40 of sheet G, as will discussed later in more detail. Although not limiting in the present invention, in the embodiment of the invention illustrated in FIGS. 2 and 3, positioning member 56 may be one or more springs that are stretched as post 52 slides downward through opening 54 in rigid ring 48.

Although not limiting in the present invention, the spring constant for the springs 56 may vary between 5-20 lb. per inch (0.9-3.58 kilograms per cm). Collar 64 is secured along post 52 between ring 48 and bar 58. The location of collar 64 controls the maximum separation between rings 38 and 48 and further may be adjusted so that the springs 56 bias flexible ring 38 upward relative to rigid ring 48 in a manner that provides ring 38 with an initial flat configuration.

Ring 48 is supported on a drive plate 66 by supports 68. In the particular embodiment of the invention illustrated in FIGS. 2 and 3, supports 68 are rods extending downward from ring 48 which are adjustably secured to plate 66 by threaded nuts 70. If desired, the supports 68 may be secured to ring 48 by a clevis 72 to provide for angular as well as vertical adjustment of the ring 48. It should be appreciated that the ring 38 may also be supported directly from drive plate 66, e.g. in a manner as disclosed in U.S. Pat. No. 4,830,650.

Figure 3:
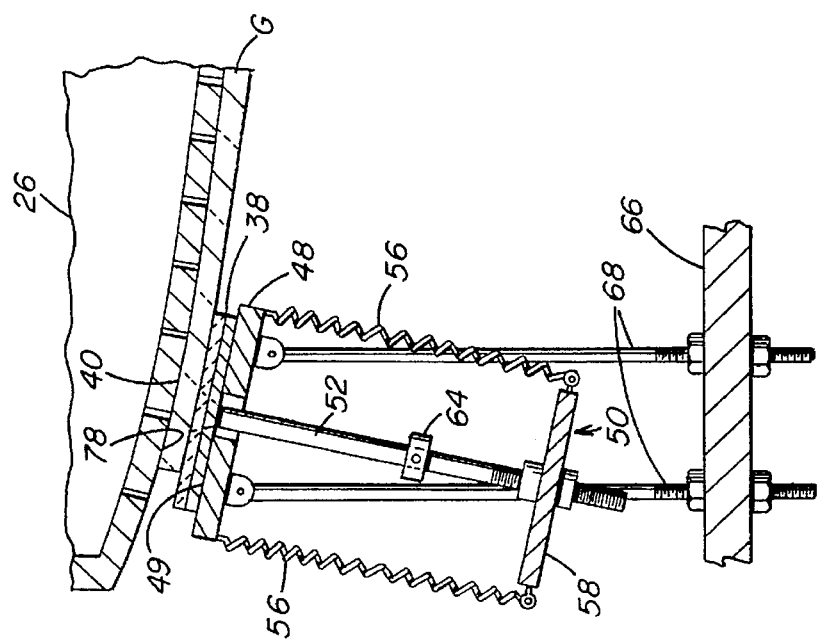
FIG. 3 is a view similar to FIG. 2 showing the flexible ring and rigid ring of the present invention pressing a glass sheet against an upper shaping mold, with portions removed for clarity.

Drive plate 66 is secured to an elevator means, which is shown in FIG. 1 as lifting cylinder 74, to vertically reciprocate lower mold 28 from an initial position, wherein the flexible ring 38 is in a flat, undeformed configuration and positioned below the support rolls 24 in the shaping station 14 as shown in FIG. 1, to a position above the support rolls 24 wherein the glass sheet is lifted off the rolls 24 by flexible ring 38 as shown in FIG. 2 and pressed against upper mold 26 by ring 38 and 48 as shown in FIG. 3, as will be discussed later.

Referring to FIGS. 1, 2 and 3, in operation the glass sheet G is conveyed through the furnace 12 to heat the sheet G to its heat softening temperature. Sensor 76 senses the position of the glass sheet G and sends this information to a controller (not shown) which controls the conveying rates of rolls 22 in furnace 12 and rolls 24 in shaping station 14 (rolls 24 are shown only in FIG. 1). As the glass sheet G exits the furnace 12 and is conveyed to shaping station 14, the flexible ring 38 of the lower mold 28 is positioned below the upper conveying surface of support rolls 24 so that the glass sheet G may be conveyed by the rolls without interference. When the glass sheet G is in proper position between the upper mold 26 and the lower mold 28, the glass sheet G is transferred from the rolls 24 to the lower mold 28. In one particular embodiment of the invention, this transfer is accomplished by activating cylinder 74 (shown only in FIG. 1) to move lower mold 28 upward to contact the marginal edge portion 40 of the glass sheet G with flexible ring 38 and lift the glass sheet G off rolls 24. As shown in FIG. 2, springs 56 initially support ring 38 in space apart relation above ring 48 and orient ring 38 so that it has a flat configuration. It should be appreciated that this transfer may also be accomplished by lowering rolls 24 to a position below ring 38 in any convenient manner known in the art to deposit the glass sheet onto the lower mold 28.

As cylinder 74 continues to lift drive plate 66 and rings 38 and 48 move upward, the glass sheet G begins to contact upper mold 26. The lifting force supplied by cylinder 74 is sufficient to overcome any biasing apart force provided by positioning member 56. It is expected that contact between sheet G and upper mold 26 will occur in the central area of the glass sheet G and progressively move outward toward the glass periphery. As the marginal edge portion 40 of the glass sheet G contacts a corresponding portion 78 of shaping surface 30 of upper mold 26, flexible ring 38 pivots and generally conforms to the shape of the mold 26, with positioning member 56 providing an initial pressing force to press the marginal edge portion 40 against corresponding portion 78 of upper mold 26. More specifically, in the particular embodiment illustrated in FIGS. 2 and 3, posts 52, which extend from the flexible ring 38 through the rigid ring 48, slide downwardly through rigid ring 48 and maintain relative vertical alignment between the rings as they move relative to each other. Springs 56 stretch allowing ring 38 to pivot and conform to the shape of upper mold 26. Furthermore, as the marginal edge portion 40 of the sheet G contacts the upper mold 26, ring 48 continues to move toward the mold 26, further stretching the springs 56. The tendency of the stretched springs 56 to return to their original shape provides an upwardly directed initial pressing force through post 52 to flexible ring 38. Cylinder 74 continues to move upward, increasing the force exerted by springs 56 until the flexible ring 38 and marginal edge portion 40 of glass sheet G are sandwiched between mold 26 and surface 49 of ring 48 to further deform and positively shape the marginal edge portion 40 as shown in FIG. 3 and ensure that marginal edge portion 40 of sheet G is shaped to the desired contour. Vacuum is drawn along surface 30 during the pressing operation to further shape the interior portions of the glass sheet G and hold the sheet G against the mold 26 after shaping.

After shaping, cylinder 74 lowers lower mold 28 and springs 56 repivot flexible ring 38 back to its initial, undeformed, flat configuration. The shaped glass sheet G is held against the upper mold 26 by vacuum. Sheet transfer means 18, such as a tempering ring 80 is then positioned beneath the upper vacuum mold 26 to receive the shaped glass sheet G. The vacuum along surface 30 is then terminated and the glass sheet G is deposited on the tempering ring 80 which thereafter moves the shaped glass sheet G to the cooling station 16 where the glass sheet G is controllably cooled to a temperature below its strain point temperature to temper the glass.

Figure 5:
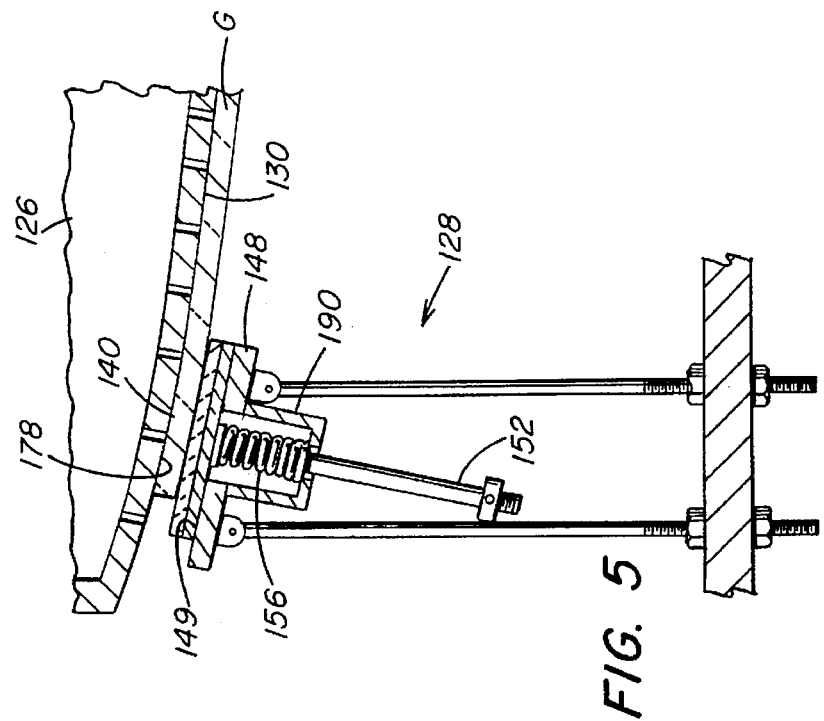
FIGS. 4 and 5 are views similar to FIGS. 2 and 3, respectively, of an alternate embodiment of the present invention.
Figure 4:
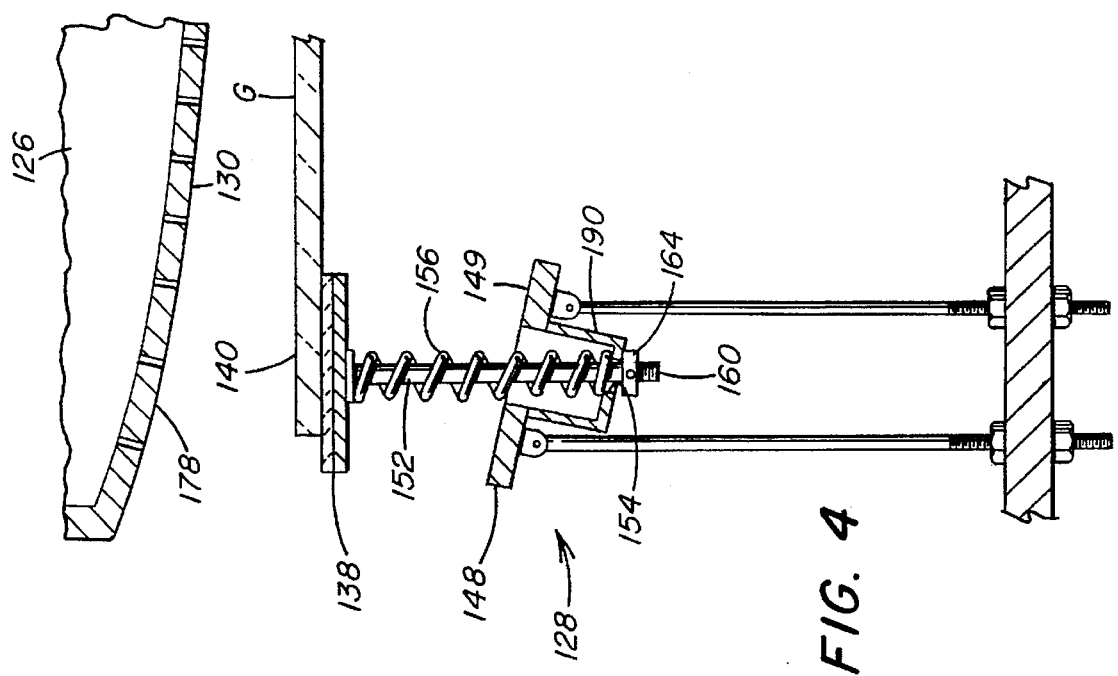

FIGS. 4 and 5 illustrate an alternate embodiment of the invention. Lower mold 128 includes an upper flexible ring 138 and lower rigid ring 148, which are similar in function to rings 38 and 48, respectively. The flexible ring 138 includes a post 152 which is secured to ring 138 and extends through opening 154 in a receiving tube 190 positioned below the rigid ring 148. A positioning member 156 is positioned between the rings 138 and 148 to initially holds the flexible ring 138 in spaced apart relation from the ring 148. In the particular embodiment shown in FIGS. 4 and 5, positioning member 156 is a spring through which post 152 extends. Collar 164 is positioned on the lower end 160 of post 152 to control the spacing between rings 138 and 148 and may be adjusted to provide ring 138 with an initial, flat configuration. During the pressing operation, as the glass sheet G is pressed against surface 130 of upper mold 126, ring 138 pivots and spring 156 compresses, providing an initial shaping force to the marginal edge portion 140 of the sheet G. In a manner similar to that discussed earlier in connection with the embodiment shown in FIGS. 2 and 3, rigid ring 148 continues to move upward, sandwiching flexible ring 138 and marginal edge portion 140 of sheet G between corresponding marginal portion 178 of upper mold 126 and surface 149 of rigid ring 148 to positively shape the glass. Receiving tube 190 is sized to receive the compressed spring 156 so that ring 148 may be in flush contact with flexible ring 138.

In another alternative, auxiliary pressing member 46 may be mounted adjacent to or on the upper mold, e.g. as disclosed in U.S. Pat. Nos. 4,496,386 to Hymore et al. and 4,501,603 to Frank et al., with an actuating device (not shown) that moves the pressing member 46 into contact with the ring 38 after the ring 38 has contacted the marginal edge portion 40 and deformed to conform to the corresponding marginal portion 78 of the upper mold 26 and shape the marginal edge portion 40.

Other variations as would be known to those skilled in the art based on the disclosure herein may be resorted to without departing from the scope of the invention as defined by the claims that follow.

We claim:

1. An apparatus for shaping heat softened sheet material comprising:
   an upper mold having a sheet shaping surface generally corresponding to a final desired contour of a sheet to be shaped;
   a lower mold having a shaping ring vertically aligned below said upper mold, said shaping ring having a flexible sheet engaging surface generally corresponding to a marginal edge portion of said sheet;
   means to transfer said sheet to be shaped onto said shaping ring such that said flexible sheet engaging surface of said shaping ring supports said sheet about said marginal edge portion;
   means to move said upper mold and lower mold relative to each other to contact said sheet with said upper mold sheet shaping surface, wherein said shaping ring presses said marginal edge portion of said sheet against said upper mold sheet shaping surface and deforms to generally conform to a corresponding portion of said sheet shaping surface of said upper mold;
   an auxiliary press member; and
   means to engage said shaping ring with said auxiliary press member to press said shaping ring against said upper mold and completely conform said flexible sheet engaging surface of said shaping ring to said corresponding portion of said sheet shaping surface of said upper mold.

2. The apparatus as in claim 1 wherein said auxiliary press member is a rigid press ring positioned on said lower mold, said press ring being vertically aligned below and movable relative to said shaping ring and having an upper surface with a fixed outline shape and elevational contour corresponding to the final desired contour of said sheet along said marginal edge portion.

3. The apparatus as in claim 2 wherein said means to transfer includes means to move said lower mold from a first position wherein said flexible sheet engaging surface of said shaping ring has an essentially flat configuration and is spaced below said sheet to be shaped, to a second position wherein said shaping ring contacts said marginal edge portion of said sheet while maintaining said flat configuration, said means to move said upper mold and lower mold includes means to move said lower mold from said second position to a third position wherein said sheet contacts said sheet shaping surface of said upper mold and said flexible sheet engaging surface of said shaping ring presses said marginal edge portion of said sheet against said corresponding portion of said sheet shaping surface of said upper mold and deforms to generally conform to said corresponding portion of said sheet shaping surface of said upper mold, and said means to engage includes means to move said lower mold from said third position to a fourth position wherein said upper surface of said press ring engages said shaping ring and presses said shaping ring and said marginal edge portion of said sheet against said upper mold.

4. The apparatus as in claim 3 wherein said means to move said upper moll end lower mold simultaneously moves both said shaping and press rings.

5. The apparatus as in claim 4 further including means to draw a vacuum along said upper mold sheet shaping surface.

6. The apparatus as in claim 5 further including a tempering ring and means to move said tempering ring between a first position beneath said upper mold to a second position spaced from said upper mold.

7. A mold assembly for shaping heat softened sheet material comprising:
   a shaping ring having a flexible sheet engaging surface generally corresponding to a marginal edge portion of a sheet to be shaped;
   shaping ring supports capable of supporting said shaping ring while allowing said flexible surface to deform; and
   an auxiliary press member movable relative to said shaping ring between a first position wherein said press member is spaced from said shaping ring, to a second position wherein said press member contacts said shaping ring.

8. The assembly as in claim 7 wherein said auxiliary press member is a rigid press ring vertically aligned below and movable relative to said shaping ring, said press ring having an upper surface with a fixed outline shape and elevational contour corresponding to a final desired contour of said marginal edge portion of said sheet to be shaped.

9. The assembly as in claim 8 wherein each of said shaping ring supports include means to maintain general vertical alignment between said shaping ring and said press member and positioning members located relative to said shaping ring and press ring to allow said flexible surface of said shaping ring to deform and initially hold said shaping ring and press ring in spaced apart relation.

10. The assembly as in claim 9 wherein said positioning members includes at least one spring member positioned between said shaping ring and said press ring.

11. The assembly as in claim 9 wherein said means to maintain general vertical alignment includes posts secured to said shaping ring and extending slidably downwardly through said press ring.

12. The assembly as in claim 11 wherein said positioning members include spring members secured to said press ring and to each of said posts at a location below said press ring.

13. The assembly as in claim 12 further including a drive plate positioned below said press ring, and press ring supports extending from said drive plate to support said press ring.

14. The assembly as in claim 13 wherein said press ring supports include means to adjust said upper surface of said press ring relative to said drive plate.

15. A method of shaping heat softened sheet material comprising:
   engaging marginal edge portions of a sheet to be shaped with a shaping ring having a flexible sheet engaging surface;
   moving said shaping ring and sheet toward an upper shaping mold having a contoured shaping surface generally corresponding to a final desired shape of said sheet;
   pressing said sheet against said contoured shaping surface of said upper shaping mold while deforming said flexible surface of said shaping ring to generally conform said marginal edge portions of said sheet to corresponding portions of said upper shaping mold;
   contacting said shaping ring with an auxiliary press member; and
   pressing said auxiliary press member against said shaping ring to further shape said marginal edge portions of said sheet between said shaping ring and said upper mold.

16. The method as in claim 15 wherein said auxiliary press member is a rigid press ring having a fixed outline shape and elevational contour generally corresponding to a final desired shape of said sheet along said marginal edge portions of said sheet to be shaped and further including the step of positioning said press ring at a first position vertically aligned below and spaced from said shaping ring and wherein said contacting step includes the step of moving said press ring from said first position to a second position to contact said shaping ring with said press ring.

17. The method as in claim 16 further including the step of maintaining said shaping and press rings in spaced apart relation during said shaping ring moving step and said sheet pressing step.

18. The method as in claim 17 wherein a portion of said press ring moving step is performed during said shaping ring moving step and said sheet pressing step and said press ring moving step is completed after said sheet pressing step.

19. The method as in claim 18 further including the steps of drawing a vacuum along said contoured shaping surface of said upper shaping mold during at least a portion of said auxiliary press member pressing step, and subsequently moving said shaping and press rings away from said upper shaping mold while holding said shaped sheet against said contoured shaping surface of said upper shaping mold, and subsequently positioning a tempering ring below said sheet, discontinuing said vacuum to deposit said sheet onto said tempering ring and moving said tempering ring and sheet to a location removed from said upper shaping mold to controllably cool said sheet.

* * * * *

UNITED STATES PATENT AND TRADEMARK OFFICE
CERTIFICATE OF CORRECTION

PATENT NO.   : 5,649,990

DATED        : July 22, 1997

INVENTOR(S)  : Frank et al.

It is certified that error appears in the above-identified patent and that said Letters Patent is hereby corrected as shown below:

Claim 4 column 7, line 66, please delete "moll end" and insert --mold and--. Claim 19 column 10, line 8, please delete "shaped".

Signed and Sealed this

Twenty-second Day of September, 1998

Attest:

BRUCE LEHMAN

Attesting Officer

Commissioner of Patents and Trademarks